No. 617,796. Patented Jan. 17, 1899.
G. W. WRIGHT.
RUBBER BALL.
(Application filed Mar. 17, 1898.)

(No Model.)

Witnesses. Inventor
Granville W. Wright,
by E. P. Bumyer & Co.,
his attorneys.

UNITED STATES PATENT OFFICE.

GRANVILLE W. WRIGHT, OF NEW HAVEN, CONNECTICUT.

RUBBER BALL.

SPECIFICATION forming part of Letters Patent No. 617,796, dated January 17, 1899.

Application filed March 17, 1898. Serial No. 674,162. (No model.)

*To all whom it may concern:*

Be it known that I, GRANVILLE W. WRIGHT, a citizen of the United States, and a resident of New Haven, in the county of New Haven and State of Connecticut, have invented certain new and useful Improvements in Rubber Balls, of which the following is a specification.

My invention relates to rubber balls, and the objects of the same are to produce an inflatable ball of attractive appearance from three segments of thin sheet-rubber having the coloring-matter incorporated in the sheet and providing the ball with rubber buttons or masses of gum at the points where the segments are united inside the ball in order that the ball may be properly balanced to rebound in a straight line and in order that the ball may roll straight from one place to another on the floor or ground. I attain these objects by means of the construction shown in the accompanying drawings, in which—

Figure 1:
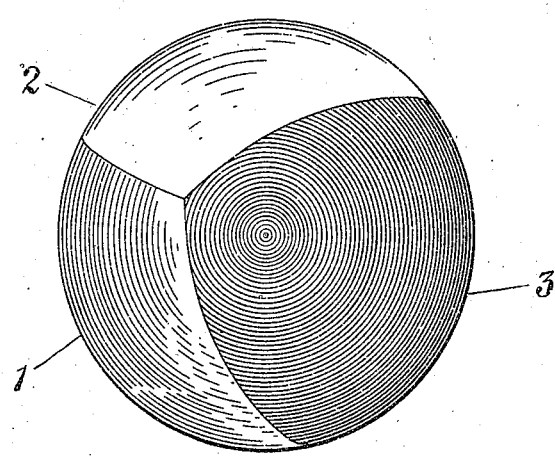
Figure 2:
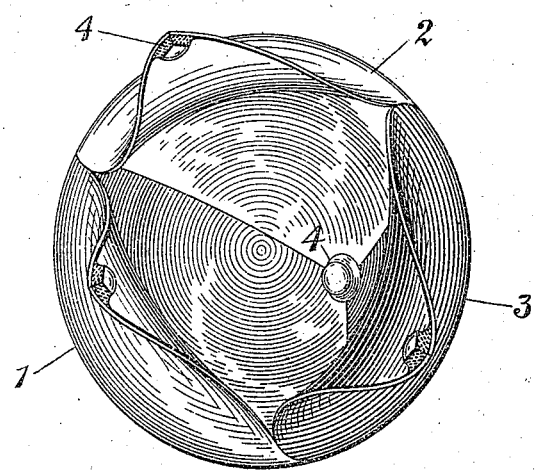

Figure 1 is a perspective view of my invention. Fig. 2 is a view looking inside the ball before the segments are united and before the ball is finished.

The ball is made up from segments of thin sheet-rubber, and, as shown in the drawings, the segments are of different color, the segment marked 1 being red, the segment 2 white, and the segment 3 blue. At 4 a mass of rubber in the form of a button is secured at the meeting points of the segments for the purpose of holding the points firmly in place and to also serve the purpose of balancing the ball. The buttons or masses of rubber 4 are secured at diametrically opposite points within the ball, and the result is that the ball is equally weighted, so that it will rebound in a straight line or roll straight from one place to another.

When the points of the segments are united and secured together, a pneumatic needle is inserted at the meeting points and the ball is inflated. When the needle is withdrawn, the mass of gum closes the opening and holds the air within the ball until the gum hardens and sets.

What I desire to secure by Letters Patent and claim is—

1. A rubber ball made up of segments cut from sheet-rubber having coloring-matter incorporated therein, said segments being united at their edges, and the ball having interior balancing buttons, substantially as described.

2. A rubber ball made up of thin sheet-rubber segments, and having masses of rubber or gum at the meeting points of the segments inside the ball to balance the same, substantially as described.

Signed at New Haven, in the county of New Haven and State of Connecticut, this 15th day of March, A. D. 1898.

GRANVILLE W. WRIGHT.

Witnesses:
 HOWARD C. RICH,
 L. M. BRAUTLECHT.